(12) United States Patent
Sekiya et al.

(10) Patent No.: US 6,450,055 B1
(45) Date of Patent: Sep. 17, 2002

(54) BALL SCREW APPARATUS

(75) Inventors: Noriaki Sekiya; Daisuke Maruyama; Toshiyuki Iehisa; Kazuo Miyaguchi, all of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/653,072

(22) Filed: Aug. 31, 2000

(30) Foreign Application Priority Data

Sep. 3, 1999 (JP) .......................................... 11-250299

(51) Int. Cl.[7] .............................................. F16H 25/22
(52) U.S. Cl. .................................................. 74/424.87
(58) Field of Search ...................... 74/424.82, 424.83, 74/424.84, 424.85, 424.86, 424.87, 424.88

(56) References Cited

U.S. PATENT DOCUMENTS 5,653,145 A * 8/1997 Kobayashi et al. ...... 74/424.87
6,282,972 B2 * 9/2001 Kuramochi et al. ..... 74/424.87

FOREIGN PATENT DOCUMENTS

| DE | 877 080 | 5/1953 |
| DE | 2715762 A1 | 10/1977 |
| DE | 3304784 C2 | 9/1983 |
| DE | 19509265 A1 | 9/1995 |
| DE | 19803026 A1 | 8/1999 |
| JP | 63-6504 | 2/1988 |

OTHER PUBLICATIONS

Schunck, J., "Walzschraubtriebe und ihre Anwendung im Werkseugmaschinenbau," Industrie–Anzieger, vol. 89, No. 60, Jul. 28, 1967.

German search report 10042610.7 Feb. 8, 2001.

* cited by examiner

*Primary Examiner*—Allan D. Herrmann
(74) *Attorney, Agent, or Firm*—Christensen O'Connor Johnson Kindness PLLC

(57) ABSTRACT

A ball screw apparatus comprises a screw shaft, a nut, and a plurality of balls. A first helical groove is formed at an outer peripheral surface of the screw shaft. A second helical groove is formed at an inner peripheral surface of the nut. A rolling contact way of balls is defined by the first helical groove and the second helical groove facing each other. A connecting way formed of a tube for connecting a part and another part of the rolling contact way is provided on the nut. An endlessly communicating circuit is defined by the connecting way and the rolling contact way. Each of the balls is endlessly arranged in the circuit. A smoothly continuous machined portion is formed by cutting out an angular portion between the helical groove and the connecting way of the nut.

8 Claims, 5 Drawing Sheets

BALL SCREW APPARATUS

CROSS-REFERENCE TO RELATED APPLICATIONS

This application is based upon and claims the benefit of priority from the prior Japanese Patent Application No. 11-250299, filed Sep. 3, 1999, the entire contents of which are incorporated herein by reference.

BACKGROUND OF THE INVENTION

This invention relates to a ball screw apparatus used for a feed mechanism or the like of various devices.

A ball screw apparatus is a machine element for converting a rotary motion into a linear motion for example. The ball screw apparatus comprises a screw shaft on whose outer peripheral surface a first helical groove for rolling balls is formed, and a nut to be fitted on an inner periphery of the screw shaft. A second helical groove associated with the first helical groove is formed on an inner peripheral surface of the nut.

A helical rolling contact way of balls is formed by the first and second helical grooves facing each other. A part and another part of the rolling contact way, which are apart from each other, communicate with each other via a connecting way provided on the nut.

An endless ball circuit is defined by the rolling contact way of balls and the connecting way. A number of balls are contained in the ball circuit. The material of the balls is steel, ceramic, plastic, or resin, etc. These balls are endlessly and successively arranged within the ball circuit.

When the screw shaft rotates relative to the nut, the rotation is transmitted to the nut via the balls between the screw shaft and the nut, and thereby the nut moves in the axial direction of the screw shaft. In company with this movement, each ball endlessly circulates in the ball circuit. By this endless circulation of the balls, the nut moves smoothly with high accuracy in the axial direction of the screw shaft in accordance with the rotation of the screw shaft.

FIG. 6 shows a typical view of a cross section of a conventional tube-type ball screw apparatus 100. A nut 2 is mounted on an outer periphery of a screw shaft 1. A first helical groove 1a is formed on an outer peripheral surface of the screw shaft 1. A second helical groove 2a facing the first helical groove 1a is formed on an inner peripheral surface of the nut 2. A helical rolling contact way of balls 3 is formed by the first and second helical grooves 1a and 2a.

Through holes 4a and 4b are formed at a peripheral wall of the nut 2. These through holes 4a and 4b are connected to each other by a tube 5 provided on an outer peripheral part of the nut 2. Both ends of the tube 5 are inserted in the through holes 4a and 4b respectively. The through holes 4a and 4b and the tube 5 constitute a connecting way 6 for communicating a part and another part of the rolling contact way 3, which are apart from each other.

A ball circuit 7 is defined by the rolling contact way 3 communicating endlessly via the connecting way 6. A number of balls 8 are contained in the ball circuit 7 so as to succeed endlessly. These balls 8 circulate in the ball circuit 7 while rolling in the ball circuit 7 when the screw shaft 1 and the nut 2 relatively rotate.

In this ball screw apparatus 100, for example, when the nut 2 rotates with respect to the screw shaft 1 in a direction shown by an arrow R in FIG. 7, each ball 8 rolls along the helical groove 1a in the direction of the arrow R. Since the rotation speed of the nut 2 is faster than the moving speed of the balls 8, each ball 8 moves from the tube 5 toward the helical groove 2a of the nut 2 via one through hole 4a.

In the conventional ball screw apparatus 100, for a while after starting use of the apparatus, as shown in FIG. 7, there is an angular portion 10 between the rolling contact way 3 and the connecting way 6, specifically, in the boundary between the helical groove 2a of the nut 2 and the connecting way 6. There is a problem that this angular portion 10 prevents smooth movement of balls 8 circulating through the ball circuit 7, and operability and durability of the apparatus deteriorates.

In the meantime, when an external load acts on the ball screw apparatus 100, the distance between the helical grooves 1a and 2a becomes narrow by Hertz contact between the first helical groove 1a and balls 8, Hertz contact between the second helical groove 2a and balls 8, and elastic deformation of the balls 8 themselves. This state is referred to as "elastic narrowness" in this specification.

In the state where there is elastic narrowness, the balls 8 enters from the tube 5 which is a non-loading region to the part between the helical grooves 1a and 2a which is a loading region. When the elastic narrowness exists in the helical grooves 1a and 2a, balls 8 cannot enter between the helical grooves 1a and 2a in this state. Therefore, a preceding ball 8 enters between the helical grooves 1a and 2a by being pushed by a following ball 8.

In the conventional art, the helical groove 2a of the nut 2 is machined continuously through the whole inner periphery of the nut 2, on the basis of the center diameter of the balls 8. Therefore, when the external load acts, the helical grooves 1a and 2a come into the state of elastic narrowness equally through the whole inner periphery of the nut 2. Consequently, at the instant when the ball 8 enters from the tube 5 to the helical grooves 1a and 2a, the ball 8 is rapidly compressed.

For example, in a ball screw apparatus having a diameter of 100 mm, lead of 25 mm, and a ball diameter of 19.05 mm, when the apparatus is loaded, sometimes elastic narrowness quantity between the helical grooves reaches 50 $\mu$m. In this case, when the ball enters the loading region from the non-loading region, the ball is compressed by almost 50 $\mu$m. Therefore, in particular when the load is large, there is the fear of causing the following problems:

(1) stress is concentrated on the angular portion 10 between the helical groove 2a and the end of the tube 5, and flaking occurs from the part as the origin;

(2) the balls 8 are liable to stop in the vicinity of the angular portion 10, and the balls 8 cannot smoothly circulate; and (3) when the ball 8 enters the helical groove 2a from the tube 5, the preceding ball 8 is pushed by the following ball 8, and thereby the ball is damaged and worn. Particles generated by wearing deteriorate durability of the ball screw apparatus.

BRIEF SUMMARY OF THE INVENTION

Therefore, the object of the present invention is to provide a ball screw apparatus which can circulate balls more smoothly to maintain good operability and improve durability.

A ball screw apparatus of the present invention for achieving the above object comprises:

a screw shaft having a first helical groove at an outer peripheral surface thereof;

a nut fitted on an outer periphery of the screw shaft, the nut having at an inner peripheral surface thereof a second helical groove which is associated with the first helical groove;

a rolling contact way defined by the first and second helical grooves facing each other;

a connecting way provided on the nut, the connecting way communicating a part and another part of the rolling contact way;

a ball circuit defined by the connecting way and the rolling contact way in an endlessly communicating fashion; and a plurality of balls contained in the ball circuit such that the balls are endlessly arranged, and a machined portion with a smooth shape which is formed on the inner peripheral surface of the nut by cutting out an angular portion between the rolling contact way and the connecting way.

The machined portion formed by means of crowning or the like has such a shape that a distance between the helical grooves gradually decreases in a direction in which balls enter between the helical grooves from the connecting way. The machined portion preferably extends from an end of the connecting way in a circumferential direction of the nut and is formed within a range of 90° from the angular portion in the circumferential direction of the nut. Thereby, when a ball enters the rolling contact way from the connecting way, the ball is gradually compressed, and concentration of stress on the helical groove can be avoided. If the machined portion exceeds the range of 90° from the angular portion in the circumferential direction of the nut, the load capacity of the ball screw apparatus is reduced. Therefore, the maximum region for forming the machined portion is 90° from the angular portion.

The cutting depth of the machined portion is preferably greater than the elastic narrowness amount of the helical groove. In particular, the range of the cutting depth in the radial direction of the nut is preferably from $\frac{1}{400}$ to $\frac{1}{10}$ of the diameter of the ball. If the cutting depth is equal to or less than $\frac{1}{400}$ of the diameter of the ball, the balls do not move smoothly, and the above object to be solved by the present invention cannot be solved. If the cutting depth exceeds $\frac{1}{10}$ of the diameter of the ball, the operability of the ball screw apparatus deteriorates.

According to the present invention as described above, by forming the machined portion between the rolling contact way and the connecting way, the balls circulate smoothly from the beginning of manufacturing the ball screw apparatus. The ball screw apparatus of the present invention has a good operability, and the durability of the apparatus can be enhanced. Further, since the balls can easily enter the loading region between the helical grooves from the non-loading region inside the connecting way, damage and wearing due to contact of the balls can be restrained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 3:
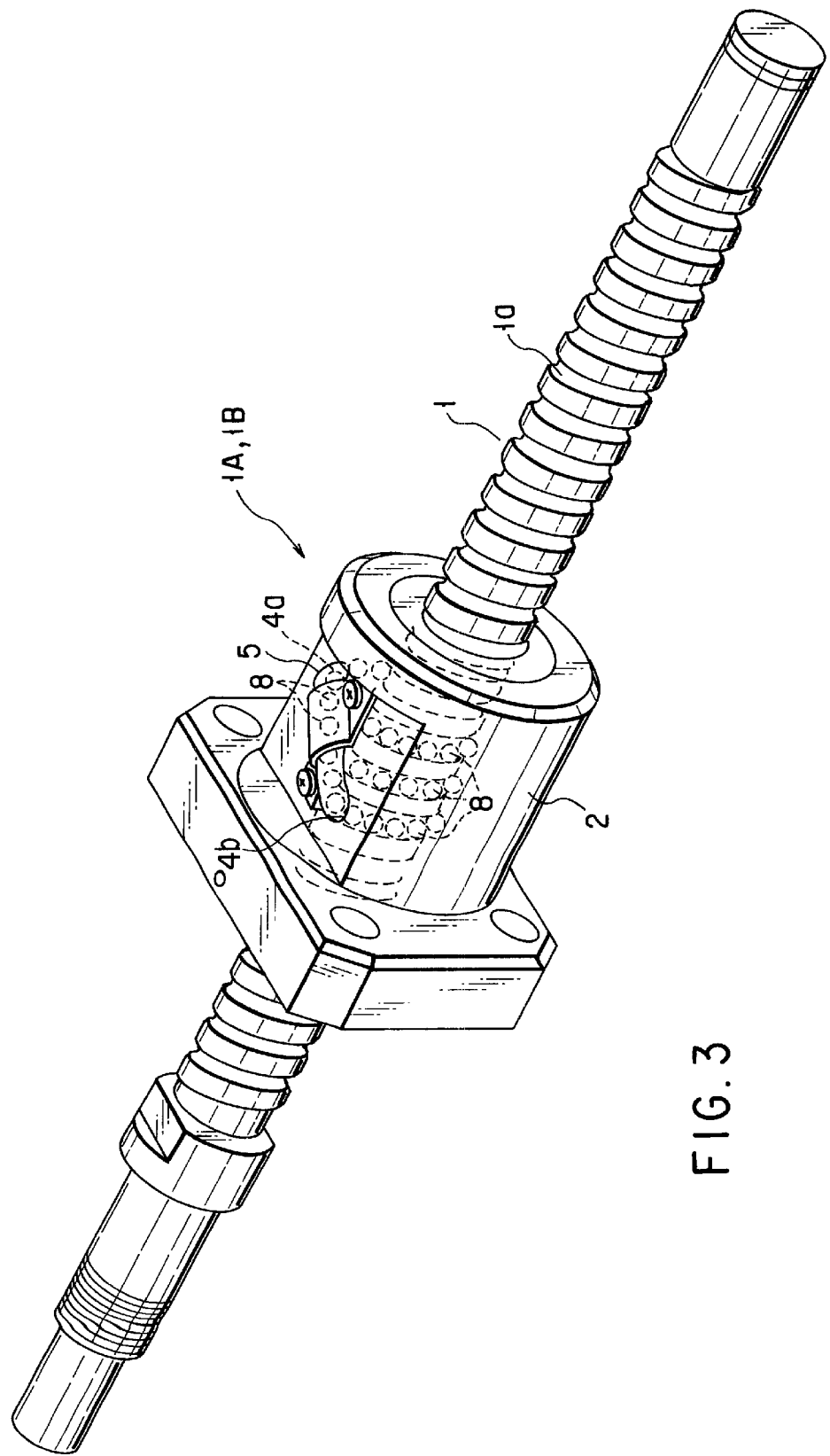
FIG. 3 is a perspective view showing a whole appearance of the ball screw apparatus of the present invention.

A first embodiment of the present invention will now be described with reference to FIGS. 1 and 3.

Figure 1:
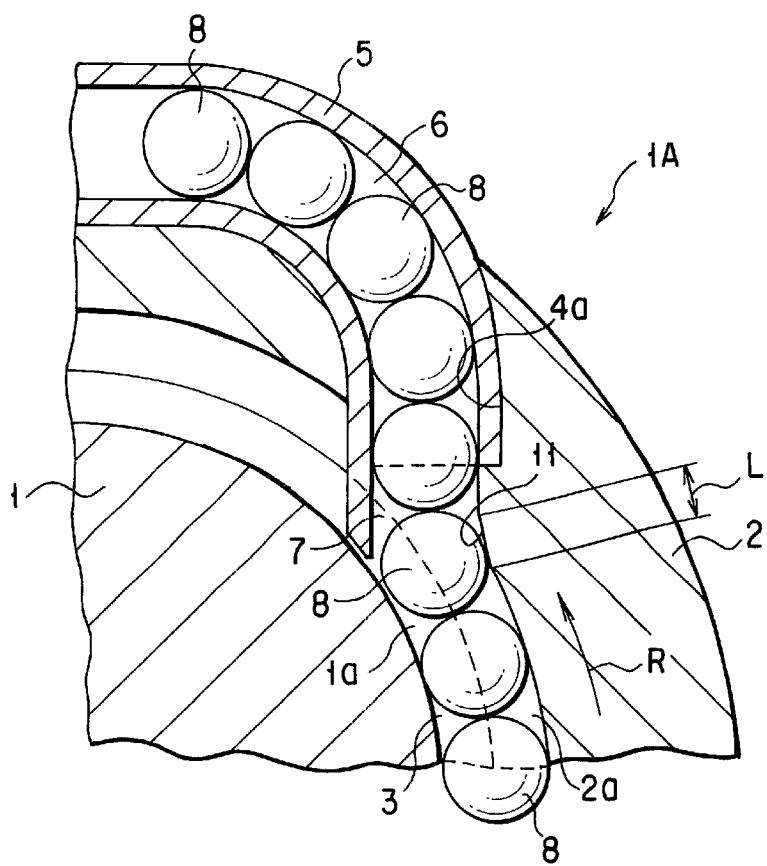
FIG. 1 is a cross-sectional view of a part of a ball screw apparatus according to a first embodiment of the present invention.

FIG. 1 shows a main part of a tube-type ball screw apparatus 1A according to the first embodiment of the present invention. As shown in FIG. 3, a nut 2 is mounted on an outer periphery of a screw shaft 1. A first helical groove 1a is formed at an outer peripheral surface of the screw shaft 1. As shown in FIG. 1, a second helical groove 2a corresponding to the first helical groove 1a is formed at an inner peripheral surface of the nut 2. A helical rolling contact way of balls 3 is defined by these helical grooves 1a and 2a facing each other.

Through holes 4a and 4b are formed at a peripheral wall of the nut 2. These through holes 4a and 4b are connected by a tube 5. The tube 5 is disposed along an outer periphery of the nut 2. Both ends of the tube 5 are inserted in the through holes 4a and 4b respectively. These through holes 4a and 4b and the tube 5 constitute a connecting way 6 for communicating a part and another part of the rolling contact way 3, which are apart from each other.

A ball circuit 7 is defined by the rolling contact way 3 communicating endlessly via the connecting way 6. A number of balls 8 are contained within the ball circuit 7 in an endlessly succeeding state. These balls 8 are formed of a material selected from steel, ceramic, plastic and resin, etc. The balls 8 infinitely circulate in the ball circuit 7 while rolling in the ball circuit 7 when the screw shaft 1 rotates relatively.

For example, when the nut 2 of the ball screw apparatus 1A rotates with respect to the screw shaft 1 in a direction shown by an arrow R, each ball 8 rolls along the helical groove 1a in the direction of the arrow R. Since a rotation speed of the nut 2 is faster than a moving speed of the balls 8, each ball 8 moves from the tube 5 toward the helical groove 2a of the nut 2 via one through hole 4a.

Figure 7:
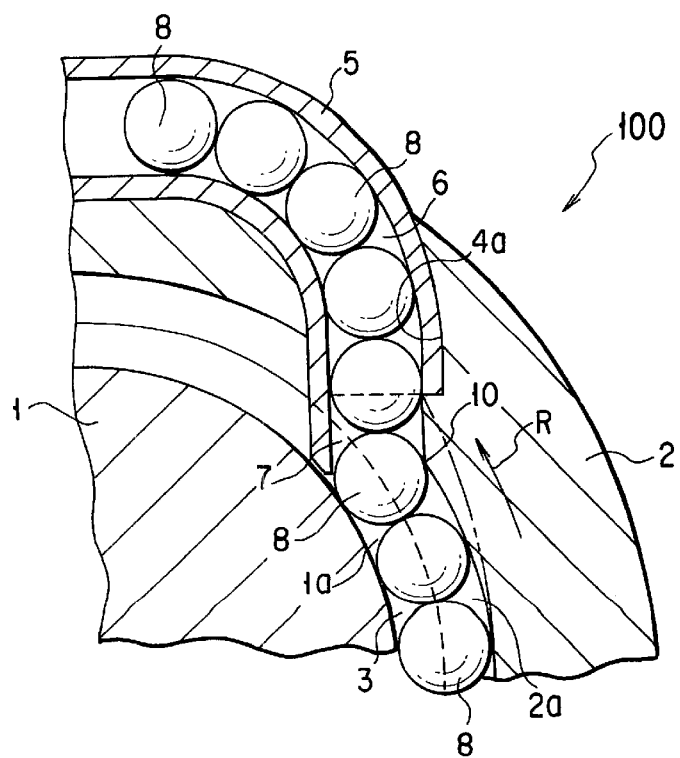
FIG. 7 is an enlarged cross-sectional view showing a part of the conventional ball screw apparatus shown in FIG. 6.

In the conventional ball screw apparatus 100 shown in FIG. 7, there is an angular portion 10 between the rolling contact way 3 and the connecting way 6. In comparison with this, in the ball screw apparatus 1A of the present invention shown in FIG. 1, the angular portion 10 is cut out in the manufacturing process of the apparatus, and thereby a machined portion 11 having a flat and smooth shape is formed. The machined portion 11 is formed through length L in the peripheral direction of the nut 2 by chamfering a part of the helical groove 2a in the boundary of the helical groove 2a and the connecting way 6. The machined portion 11 is tapered so that a distance between the helical grooves 1a and 2a gradually decreases in a direction in which balls 8 enters between the helical grooves 1a and 2a from the connecting way 6.

In the ball screw apparatus 1A structured as described above, the rolling contact way 3 and the connecting way 6 are connected smoothly. Therefore, in the ball screw apparatus 1A, the balls 8 circulate within the circuit 7 smoothly from the beginning of operation directly after manufacturing the apparatus. Therefore, the apparatus has a good operability, the balls 8 and the ball circuit 7 are hardly worn, particles generated by wearing are restrained and thereby durability of the apparatus is improved.

Figure 2:
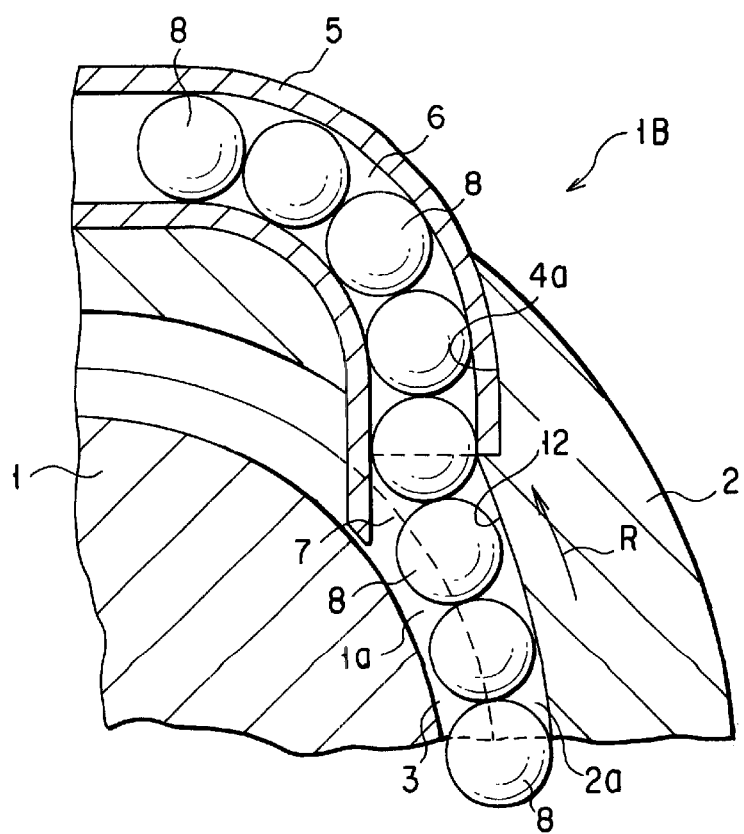
FIG. 2 is a cross-sectional view of a part of a ball screw apparatus according to a second embodiment of the present invention.

FIG. 2 shows a main part of a tube-type ball screw apparatus 1B according to a second embodiment of the present invention. The structure of the ball screw apparatus 1B is similar to the ball screw apparatus 1A of the first embodiment except the following machined portion 12. Therefore, the same reference numerals as those of the first embodiment are assigned to the parts of the ball screw apparatus 1B common to the first embodiment, and their explanations will be omitted.

The ball screw apparatus 1B of the second embodiment comprises the machined portion 12 formed by cutting out a relatively long region including the angular portion 10 of the conventional ball screw apparatus 100. The machined portion 12 is formed by cutting out a part of a helical groove 2a of a nut 2 into a smooth shape having a large radius of curvature, by means of crowning using abrasive means such as a grind stone.

Figure 4:
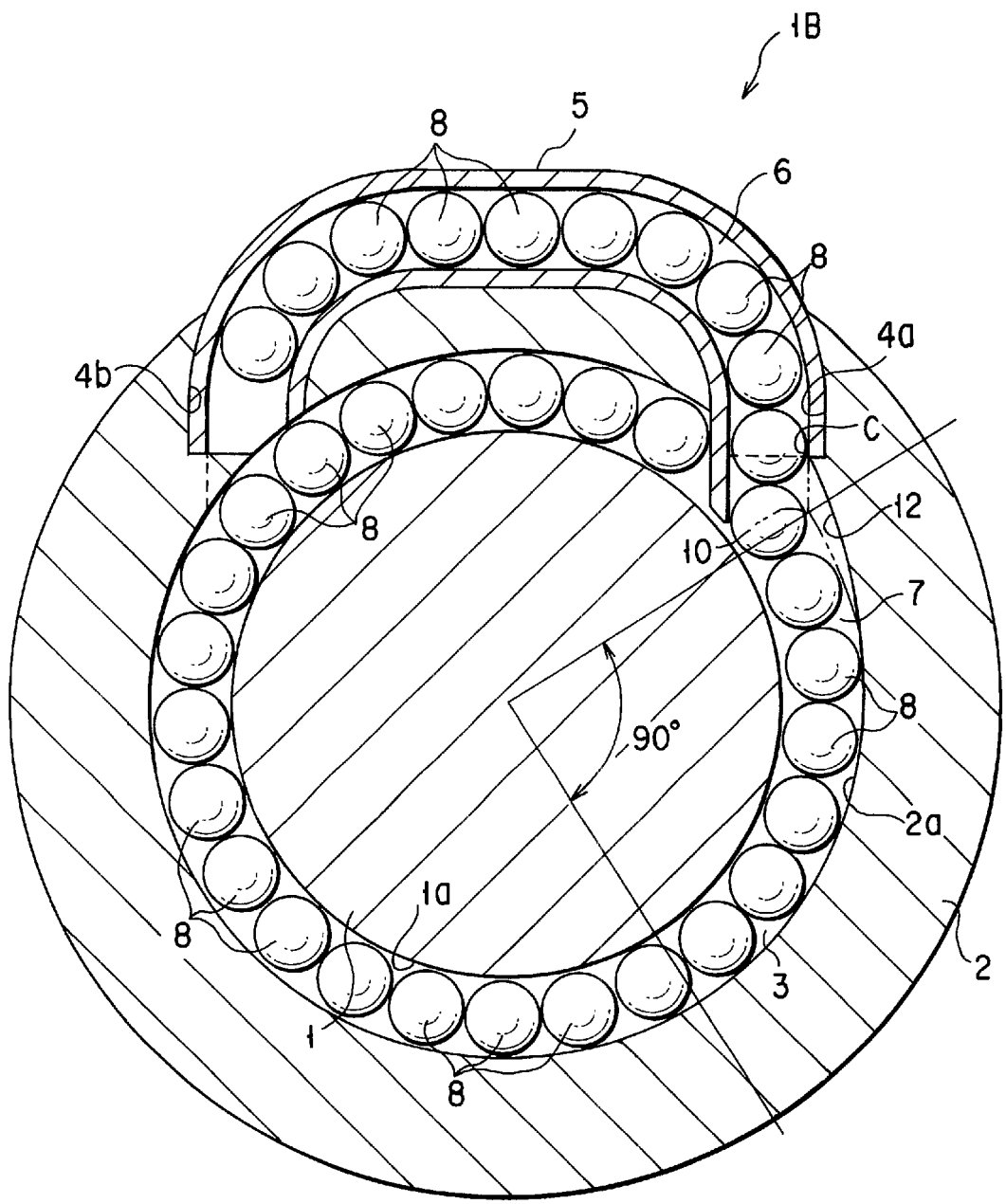
FIG. 4 is a cross-sectional view of the ball screw apparatus according to the second embodiment shown in FIG. 2.

As shown in FIG. 4, the machined portion 12 extends from an end C of a connecting way 6 in a circumferential direction of the nut 2. The machined portion 12 is tapered so that a distance between the helical grooves 1a and 2a gradually decreases in a direction in which balls 8 enters between the helical grooves 1a and 2a from the connecting way 6. The machined portion 12 extends from the end C of the connecting way 6 in the circumferential direction of the nut 2, and is formed within the range of 90° from the angular portion 10 in the circumferential direction of the nut 2. If the machined portion 12 is formed to exceed 90° from the angular portion 10 in the circumferential direction of the nut 2, load capacity of the ball screw apparatus 1B is reduced. Therefore, the maximum region for forming the machined portion 12 is a region of 90° from the angular portion 10.

By forming such machined portion 12, balls 8 can easily enter between the helical grooves 1a and 2a, and the balls 8 are gradually compressed as the balls 8 move. Thereby, concentration of stress on the helical groove 2a is restrained.

Figure 5:
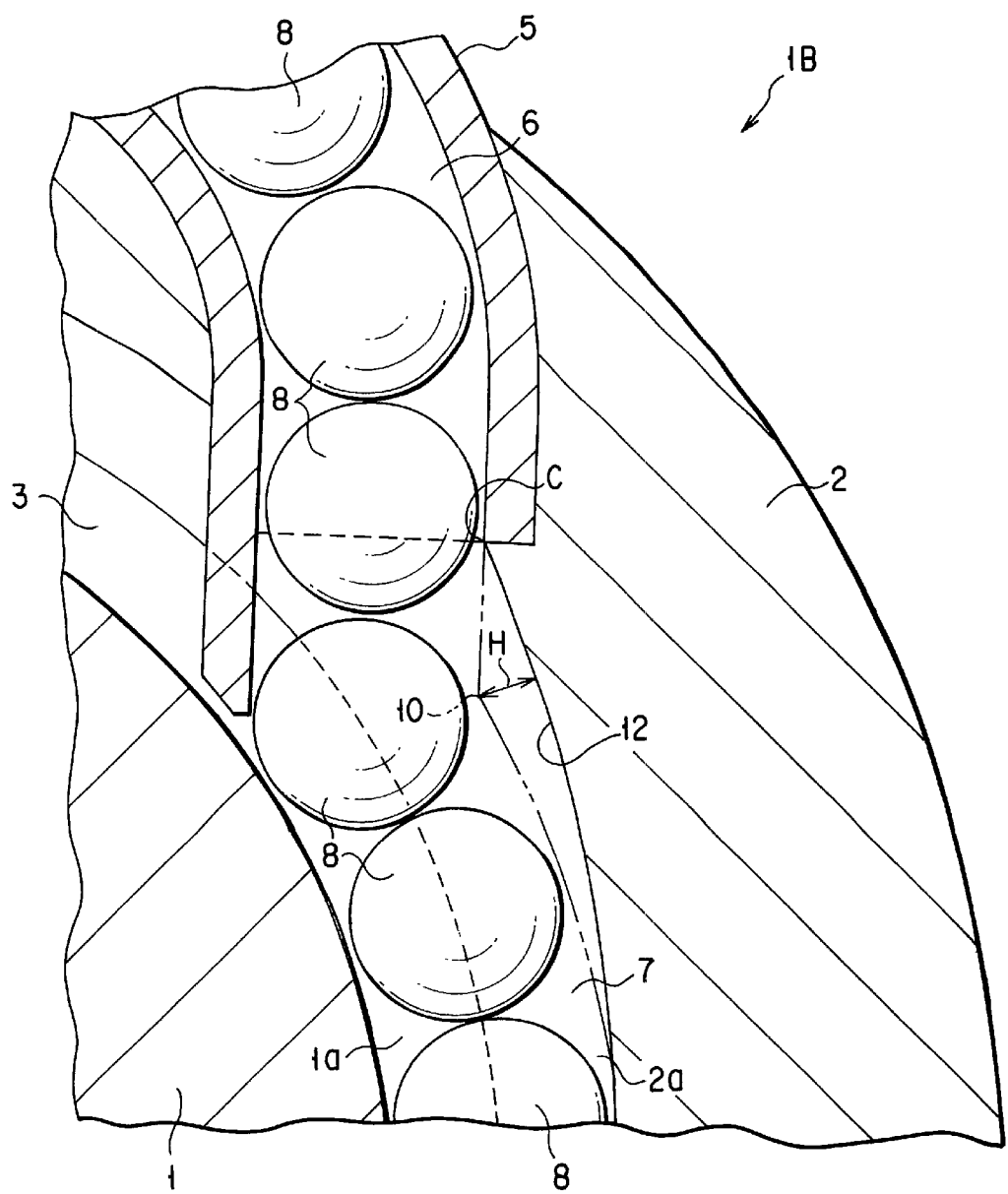
FIG. 5 is an enlarged cross sectional view of a part of the ball screw apparatus according to the second embodiment shown in FIG. 2.
Figure 6:
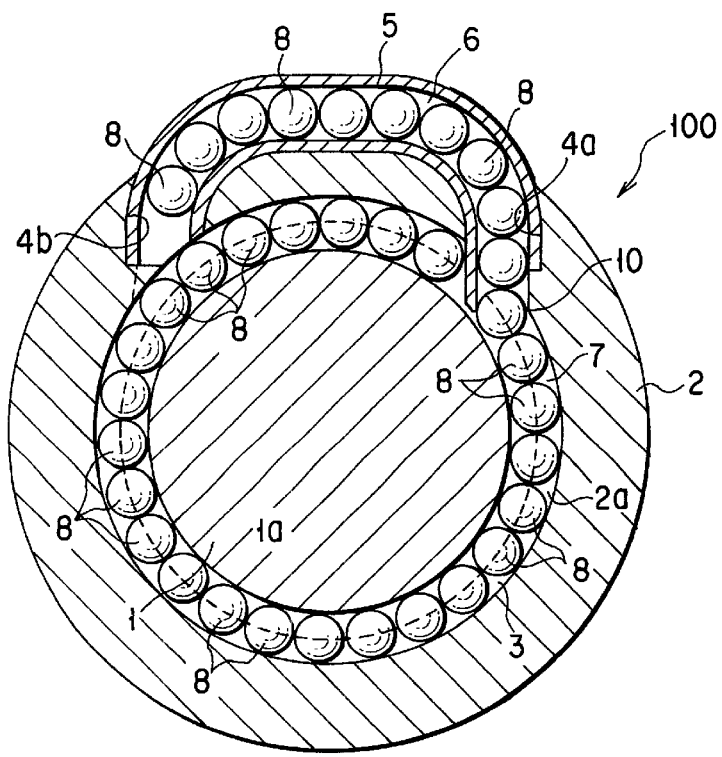
FIG. 6 is a cross-sectional view of a conventional ball screw apparatus.

An cutting depth H (a cutting depth with respect to the radial direction of the nut 2) of the machined portion 12 shown in FIG. 5 is set to be greater than the elastic narrowness amount of the helical grooves 1a and 2a by the above reason. Specifically, the cutting depth H ranges from $1/400$ to $1/10$ of the diameter of the ball 8.

Also in the ball screw apparatus 1B having such a structure, since the rolling contact way 3 and the connecting way 6 are connected smoothly, the balls 8 circulate smoothly in the ball circuit 7 from the beginning of operation of the manufactured ball screw apparatus 1B. Therefore, wearing of the balls 8 and the ball circuit 7 is restrained from the beginning of operation of the ball screw apparatus 1B, a good operability of the apparatus is obtained, and durability of the apparatus can be enhanced.

Further, the present invention can be applied, in the same manner, to an internal-circulation-type ball screw apparatus using a bridge piece as its connecting way, and a ball screw apparatus using an end cap having a connecting way. In short, the ball screw apparatus of the present invention is made by forming a smoothly continuous machined portion by cutting out an angular portion between the connecting way and the helical groove provided at the nut.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A ball screw apparatus, comprising:

a screw shaft having a first helical groove at an outer peripheral surface thereof;

a nut fitted on an outer periphery of the screw shaft, the nut having at an inner peripheral surface thereof a second helical groove which is associated with the first helical groove;

a rolling contact way defined by the first and second helical grooves facing each other;

a connecting way provided on the nut, the connecting way communicating a part and another part of the rolling contact way;

a ball circuit defined by the connecting way and the rolling contact way in an endlessly communicating fashion;

a plurality of balls contained in the ball circuit such that the balls are endlessly arranged, and a machined portion with a smooth shape which is formed on the inner peripheral surface of the nut by cutting out an angular portion between the rolling contact way and the connecting way.

2. A ball screw apparatus according to claim 1, wherein said machined portion has such a shape that a distance between the helical grooves gradually decreases in a direction in which balls enter between the helical grooves from the connecting way, and the machined portion extends from an end of the connecting way in a circumferential direction of the nut and is formed within a range of 90° from the angular portion in the circumferential direction of the nut.

3. A ball screw apparatus according to claim 1, wherein said machined portion has such a shape that a distance between the helical grooves gradually decreases in a direction in which balls enter between the helical grooves from the connecting way, and a cutting depth of the machined portion in a radial direction of the nut ranges from $1/400$ to $1/10$ of a diameter of the ball.

4. A ball screw apparatus according to claim 1, wherein said machined portion has such a shape that a distance between the helical grooves gradually decreases in a direction in which balls enter between the helical grooves from the connecting way, the machined portion extends from an end of the connecting way in a circumferential direction of the nut and is formed within a range of 90° from the angular portion in the circumferential direction of the nut, and a cutting depth of the machined portion in a radial direction of the nut ranges from $1/400$ to $1/10$ of a diameter of the ball.

5. A ball screw apparatus comprising:

a screw shaft having a first helical groove at an outer peripheral surface thereof;

a nut fitted on an outer periphery of the screw shaft, the nut having at an inner peripheral surface thereof a second helical groove which is associated with the first helical groove;

a rolling contact way defined by the first and second helical grooves facing each other;

a connecting way provided on the nut, the connecting way communicating a part and another part of the rolling contact way;

a ball circuit defined by the connecting way and the rolling contact way in an endlessly communicating fashion;

a plurality of balls contained in the ball circuit such that the balls are endlessly arranged; and a machined portion with a smooth shape which is formed on the inner peripheral surface of the nut by cutting out an angular portion between the rolling contact way and the connecting way in a manufacturing process of the apparatus, the machined portion circulating the balls smoothly in the ball circuit from a beginning of operation of the manufactured ball screw apparatus, and inhibiting the generation of particles due to wear.

6. A ball screw according to claim 5, wherein said machined portion has such a shape that a distance between the helical grooves gradually decreases in a direction in which balls enter between the helical grooves from the connecting way, and the machined portion extends from an end of the connecting way in a circumferential direction of the nut and is formed within a range of 90° from the angular portion in the circumferential direction of the nut.

7. A ball screw apparatus according to claim 5, wherein said machined portion has such a shape that a distance between the helical grooves gradually decreases in a direction in which balls enter between the helical grooves from the connecting way, and a cutting depth of the machined portion in a radial direction of the nut ranges from $1/400$ to $1/10$ of a diameter of the ball.

8. A ball screw apparatus according to claim 5, wherein said machined portion has such a shape that a distance between the helical grooves gradually decreases in a direction in which balls enter between the helical grooves from the connecting way, the machined portion extends from an end of the connecting way in a circumferential direction of the nut and is formed within a range of 90° from the angular portion in the circumferential direction of the nut, and a cutting depth of the machined portion in a radial direction of the nut ranges from $1/400$ to $1/10$ of a diameter of the ball.

* * * * *